United States Patent [19]

Slejko

[11] 4,199,449

[45] Apr. 22, 1980

[54] REMOVAL OF BACTERIA

[75] Inventor: Frank L. Slejko, Voorhees, N.J.

[73] Assignee: Rohm and Haas Company, Philadelphia, Pa.

[21] Appl. No.: 854,306

[22] Filed: Nov. 23, 1977

[51] Int. Cl.$^2$ .............................................. B01D 15/04
[52] U.S. Cl. ................................. 210/29; 210/37 R; 210/64; 210/266; 210/282; 210/501; 210/502
[58] Field of Search ..................... 210/24, 27, 29, 266, 210/282, 283, 501, 502, 510, 37 R, 64

[56] References Cited

U.S. PATENT DOCUMENTS 3,327,859   6/1967   Pall ...................................... 210/501

OTHER PUBLICATIONS

Ion Exchangers-Properties and Applications, Dorfner, Ann Arbor Science Pub. Inc., 1972, p. 22.

Primary Examiner—Charles N. Hart
Assistant Examiner—Ferris H. Lander

[57] ABSTRACT

This invention relates to an ion exchange column for the removal of bacteria from a liquid medium wherein the column has, as an indicator to indicate when the column capacity for removal of bacteria is exhausted, a filter having submicron pores which will become plugged after a short period of usage with an exhausted bacteria-removing ion exchange column so that pressure build up will noticeably reduce the flow of liquid exiting from the filter thereby indicating to the user that the ion exchange column is exhausted. This invention also relates to a process for removing bacteria from a liquid medium wherein a bacteria containing medium is passed through an ion exchange column capable of removing such bacteria and then through a filter having submicron pores. When the capacity of the ion exchange column for removing bacteria is substantially exhausted, bacteria are removed by the submicron filter which quickly plugs. The build up in pressure, as a result of the plugging of the submicron filter, results in a reduction in the flow of liquid exiting from the filter and thereby indicates to the user that the ion exchange column has become exhausted for its intended purposes.

13 Claims, 4 Drawing Figures

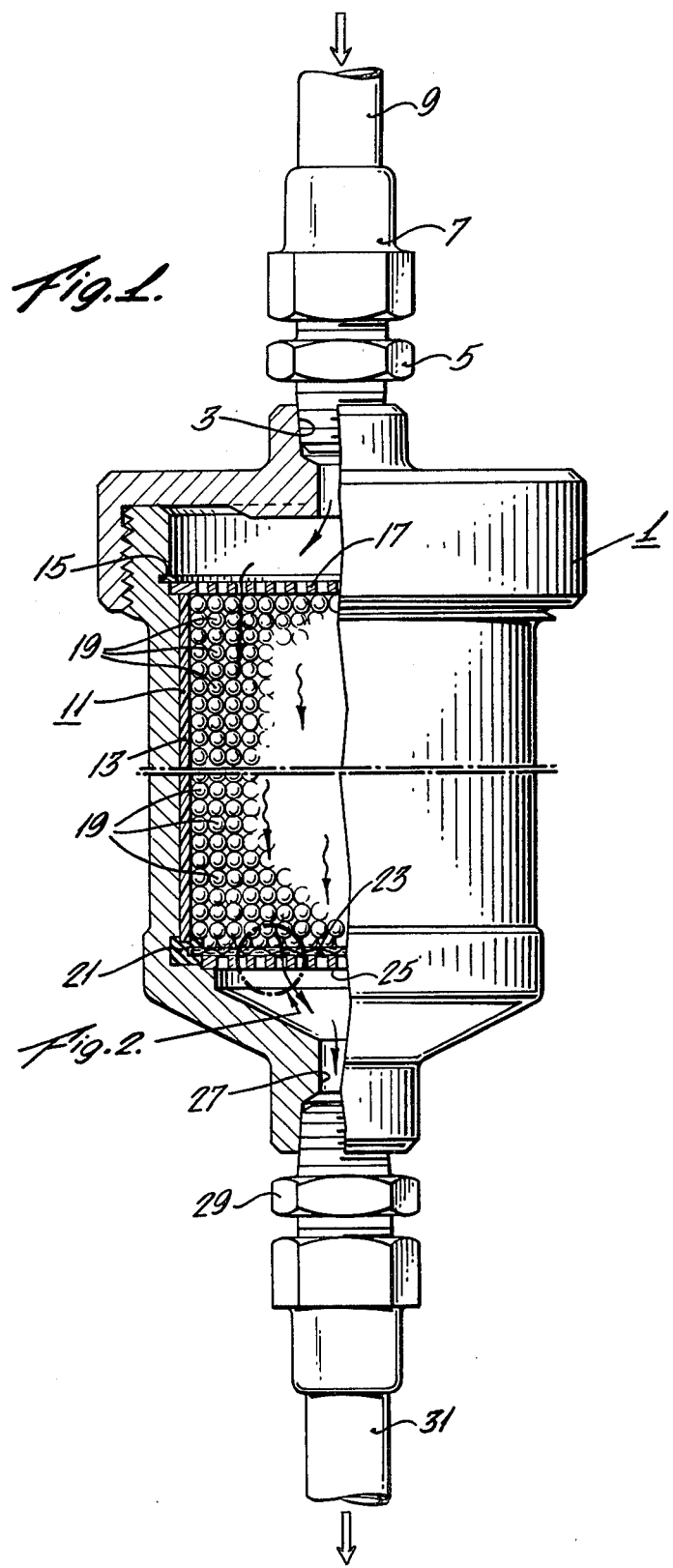

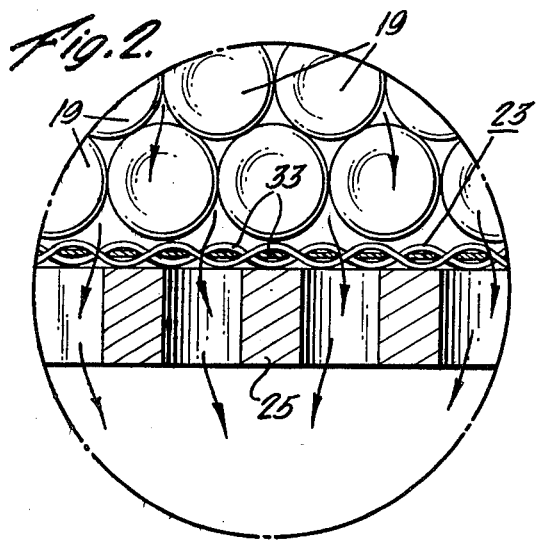
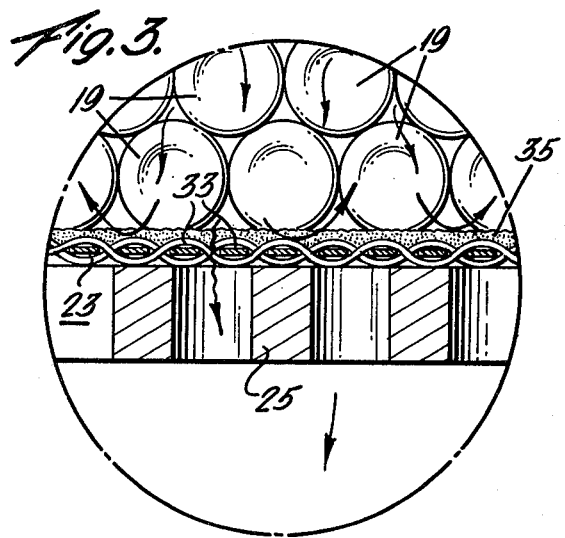
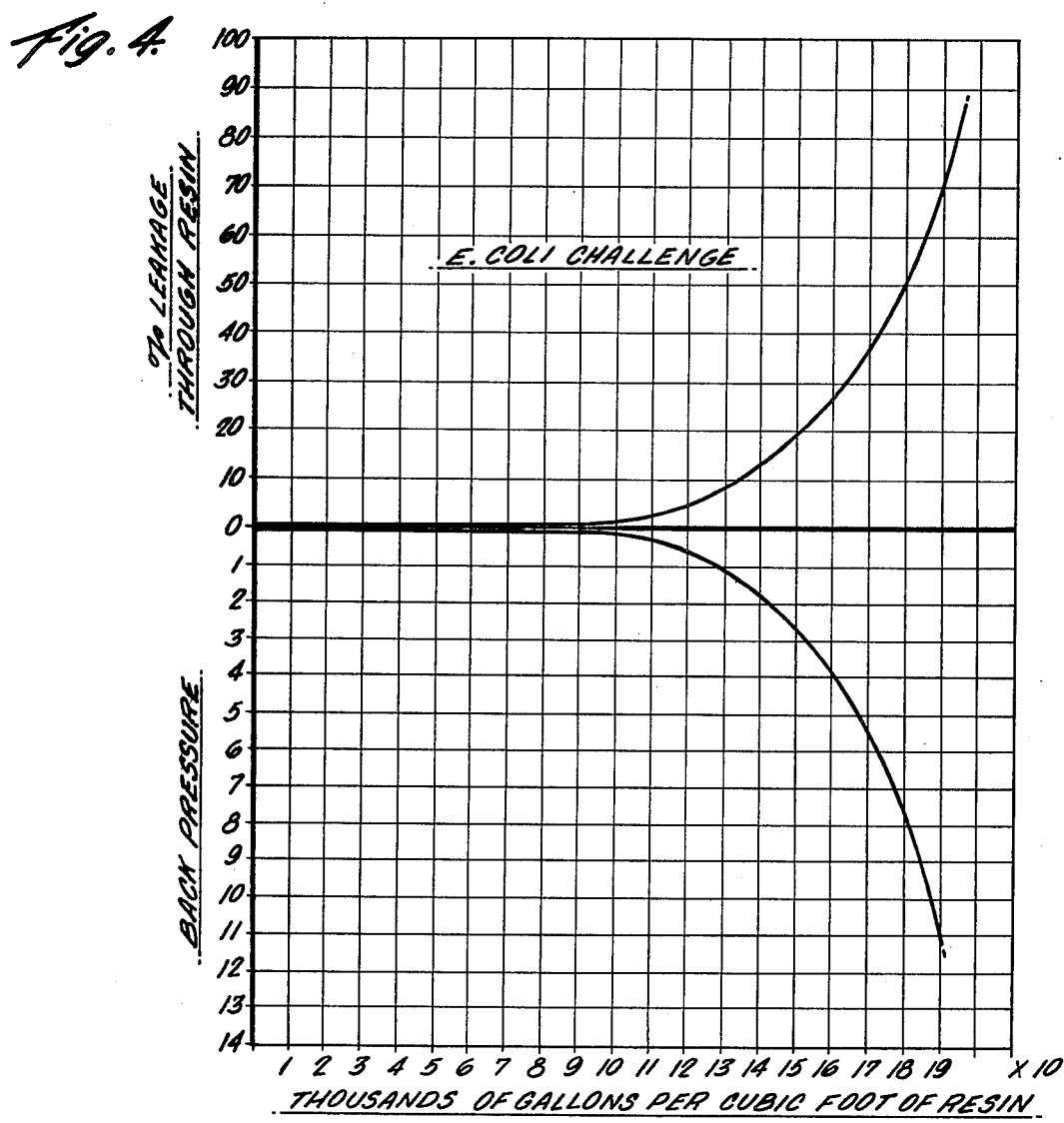

REMOVAL OF BACTERIA

BACKGROUND OF THE INVENTION

Removal of bacteria from a liquid medium such as water, is generally not a problem when there is an adequate water purification system such as those normally found in the more developed areas of the world and particularly in the more populated areas of the world such as in and about large cities. In these instances, conventional mass disinfection techniques such as chlorination, ozonation, and ultraviolet treatment are effective. These mass techniques are not practical for small domestic applications such as for treatment of private well water.

It is known that macroreticular anion exchange resins are effective in removing bacteria from a liquid medium such as water or during processing of foods in a food plant. It is also known that such macroreticular anion exchange resins may have microbiocides physically or chemically bound thereto and that liquid media containing bacteria may be removed and destroyed using such ion exchange resins with microbiocides.

The use of ion exchange resins, with or without microbiocides, to remove bacteria from liquid media has been severally limited by the fact that there has been no way to determine when the capacity of the resin to remove bacteria has been exhausted. Thus removal of bacteria using such resins has been limited because, after the capacity of such resins to remove bacteria has been substantially exhausted, the liquid effluent from the ion exchange column will contain bacteria and this fact will normally be unknown to the user of such column.

British Pat. No. 1,107,768 is directed to a water purifying apparatus for removing pyrogens from a water supply so that the water, after treatment, can be used for medical purposes such as intravenous injections. The British Patent discloses an apparatus for purifying water which includes an ion exchange column and a membrane filter. The function of the ion exchange column is not stated but the aforesaid patent states that the function of the membrane filter is to protect the ion exchange resin and the effluent from micro-organisms present in the feed water. The British Patent fails to provide for any means whereby exhaustion of the ion exchange resin is indicated. In fact, the membrane filter is arranged so that the influent passes through the membrane filter prior to passing through the ion exchange resin.

An article entitled "Preparation of Biologically Pure Water By Ion Exchange"; Saunders et al; Ion Exchange in the Process Industry Conference; London Society of Chemical Industries; London; July 16–18, 1968; pages 410–415, discloses the purification of water to render it suitable for all purposes in medicine and pharmacy. This article teaches the removal of pyrogenic substances from water by passing the water through a pre-purifier mixed resin bed followed by passing the water through a macroreticular ion exchange resin and then through a series of submicron (0.22 micron) membrane filters.

This article fails to teach the necessity for a pressure tight connection between the ion exchange resin and the membrane filter. The article also states that the final membrane filter is not essential to give sterility but may be used as an additional precaution against micro-organisms and as a barrier to prevent resin fines from passing into the effluent.

This article and British Pat. No. 1,107,768 failed to recognize the necessity for an indicator to advise the user when the capacity of the ion exchange resin was exhausted.

SUMMARY OF THE INVENTION

This invention relates to an ion exchange column for removal of bacteria from a liquid medium comprising a column having an inlet and an outlet, a macroreticular large pore size anion exchange resin disposed within said column and having a pore diameter from about 8000 Å to about 500,000 Å and capable of removing bacteria from an influent and, as an indicator for exhaustion of the capacity of said resin for removal of said bacteria, a filter having a submicron pore size from between about 0.03 to about 1.0 micron, said filter being disposed in a pressure type association with a portion of said resin remote from said inlet and being operably connected to said column whereby when the capacity of said resin for removal of bacteria is exhausted, said bacteria will be present in the effluent from said resin and will be collected by said submicron filter until the pressure within said column is increased thereby reducing the flow of liquid exiting from said filter and indicating the exhaustion of the capacity of said resin to remove bacteria.

This invention also contemplates a process for the removal of bacteria from a liquid medium comprising passing a bacteria-containing liquid medium, normally water, through an ion exchange column containing a macroreticular ion exchange resin having a pore diameter of from about 8000 Å to about 500,000 Å and capable of removing bacteria from said liquid medium and passing the effluent from said resin through a submicron filter having a pore size of from about 0.03 to about 1.0 micron while maintaining a pressure type relationship between said filter and said resin greater than the pressure exerted by the flow of said medium exiting from said resin and when the capacity of said resin for removing bacteria has been substantially exhausted, passing said bacteria-containing liquid through said filter to remove bacteria from said liquid medium exiting from said exhausted resin until the flow of liquid from said filter is substantially reduced from the flow of liquid exiting from said filter prior to exhaustion of said resin thereby indicating to the user that the capacity of said resin for removing bacteria has been substantially exhausted.

It is an object of this invention therefore to provide an ion exchange column for removal of bacteria from a liquid medium which would have an indicator to advise the user when the column capacity for removing bacteria had been substantially exhausted.

Another object of this invention is to provide a process for removing bacteria from a liquid medium wherein the indicator would function to remove bacteria leaking from the column prior to functioning as an indicator to advise the user that the capacity of such column to remove bacteria had been substantially exhausted.

Another object of this invention is to provide an apparatus and process for removing bacteria from a liquid medium which, in the case of water treatment, could be utilized directly by the consumer of such water in domestic applications.

Other objects and advantages will become apparent from the following more complete description and claims.

DETAILED DESCRIPTION

In The Drawing:

FIG. 1 is a side elevational view, partially in section, of one embodiment of this invention.

FIG. 2 is a magnified fragmentary side elevational view of the area encircled in FIG. 1.

FIG. 3 is a magnified fragmentary side elevational view of the area encircled in FIG. 1 and showing the build up of bacteria on the submicron filter and the build up of back pressure.

FIG. 4 is a composite graph which shows that as bacteria leaks through the resin, there is a build up in back pressure. The abscissa in FIG. 4 is expressed in terms of thousands of gallons per cubic foot of resin.

Referring now to FIG. 1. One embodiment of this invention is a removable canister 1 which may be threaded at its inlet 3 to mate with a male threaded member 5 which is part of a fitting 7 which is connected to an interior water pipe 9. The canister 1 has a removable cartridge generally indicated as 11. The wall 13 of the cartridge 11 may be made of any suitable material such as a plastic. The cartridge 11 is kept tightly in place within the canister 1 by a split ring 15 which serves as a retaining means. Any suitable retaining means may be used. A perforated plate 17 is part of the cartridge 11 and is disposed below the retaining means 15. The perforated plate serves to distribute the water, which enters the cannister 1, evenly above the macroreticular anion exchange resin 19. Any suitable distribution means may be used. At the end of the wall 13 remote from the perforated plate 17 is a sealing ring 21 which is an integral part of the submicron filter 23. The sealing ring 21 serves to maintain a pressure tight connection between the submicron filter 23 and the remainder of the cartridge 11. Any suitable pressure tight connection may be used in place of the sealing ring 21. Below the submicron filter 23 is a distribution plate 25 which serves to evenly distribute the effluent from the cartridge 11. The end of the canister 1, remote from the inlet 3, defines an outlet 27 through which the effluent flows after leaving the cartridge 11. Thereafter, the cartridge 11 is connected to a threaded fitting 29 which may be connected for example, to the interior household water pipe 31.

FIG. 2, which is a magnified fragmentary side elevational view of the area encirled in FIG. 1, shows the flow of water in contact with the ion exchange resin 19 through the submicron filter 23. The submicron filter 23 is composed of a series of layers of fibers 33 through which the water flows. Alternatively, the submicron filter may be composed of a thin perforated sheet of a porous polymer. The effluent from the submicron filter 23 exits evenly by means of the distribution plate 25.

FIG. 3, is identical to FIG. 2 except that FIG. 3 shows a bacterial layer 35 which has clogged the submicron filter 23 and has resulted in an increase in back pressure.

FIG. 4, is a graph which shows that the back pressure increases as the percentage of bacteria leaking through the ion exchange resin increases. The data for plotting the graph of FIG. 4 is taken from the data presented in the Examples and expanded to reflect thousands of gallons per cubic foot of resin.

The liquid, such as from a household water supply system, enters the canister 1 at the inlet 3 and then flows through a distribution device such as the perforated plate 17, into contact with the ion exchange resin 19 which is disposed within the cartridge 11. Bacteria are removed from the liquid, which is now substantially bacteria free, and the liquid then flows through the submicron filter 23.

When the capacity of the ion exchange resin 19 for removing bacteria is substantially exhausted, bacteria from the liquid will be in the liquid exiting from the resin 19. This exiting bacteria will be collected on the submicron filter 23 which will, within a short period of time, become clogged.

As the submicron filter 23 becomes clogged, the flow of liquid through the submicron filter 23 will diminish noticeably (FIG. 3). When this happens, it is an indication to the user that the capacity of the resin to remove bacteria has been exhausted and that no additional substantially bacteria-free water can be obtained from the system.

If desired, a pressure sensing device may be disposed in the water line preceding the flow of water into the canister for treatment. In this way, increases in back pressure will also be detectable by reading a guage as well as by observing the flow of liquid which has passed through the submicron filter.

It is important that the submicron filter be connected or associated with the liquid exiting from the resin in a pressure tight manner so that the connection between the resin and the submicron filter will withstand the increased pressure of the bacteria containing liquid after the resin has become exhausted and the submicron filter has clogged. The use of such a pressure tight connection will prevent bacteria containing liquid from flowing around the filter and contaminating the liquid which the user receives.

Generally the submicron filter will be connected to the cartridge in any suitable pressure tight manner such as by being disposed within the inner wall of the cartridge and having the perimeter of the filter surrounded by a rubber gasket which will enable a pressure tight fit of the filter inside the cartridge. The gasket may be an integral part of the filter element or may be a separate member.

The end of the cartridge remote from the inlet may be threaded and the filter element may be disposed in a threaded member which would mate with threads on the cartridge.

The submicron filter may also be connected to the apparatus by means of a bacteria impermeable adhesive. If desired, a combination of a gasket and a bacteria impermeable adhesive may be used.

When the apparatus is intended for household use, both the inlet and outlet portions of the canister containing the cartridge may be threaded so that the canister may be inserted into the household water line which conducts water to the tap.

In still another embodiment, the apparatus may be connected to the water tap by any suitable means such as by a snap fit over the outlet of the tap, by threading means, by an elastic connection or by any other suitable means.

The manner of connecting the apparatus to a household or other water supply is well known to those skilled in the art and the invention is not to be construed as limited to any particular means of connecting the apparatus to a water or other liquid supply.

The submicron filter will have an average pore size of from about 0.03 to about 1 micron and preferably from about 0.22 to about 0.45 micron.

If the average pore size of the submicron filter is less than about 0.03, then the flow of liquid through the submicron filter might be adversely effected. A pore size greater than 1 micron should not be used because such large pores would permit bacteria to flow through the filter.

The submicron pore size selected will ultimately be governed by the desired rate of flow of the liquid through the submicron filter and the dimension of the ion exchange column through which the liquid passes.

The dimensions of the anion exchange column will vary depending upon the total flow rate of the system and the desired life time of the unit. For example, by increasing the diameter of the column while keeping the height of the column constant, the throughput rate will be increased. If however, the height of the unit is increased and the diameter kept constant, the lifetime of the unit will be increased.

Any large pore macroreticular anion exchange resin which is capable of physically or chemically removing bacteria may be used in practicing this invention. Among the large pore macroreticular anion exchange resins which may be used are: AMBERSORB®XE-352*, a large-pore styrene-divinylbenzene copolymer containing a trimethylammonium chloride functionality; AMBERSORB®XE-342, which has the same composition as XE-352, except that about 1% Agcl is deposited within the pores of the resin; and the like. Other large pore macroreticular anion exchange resins capable of removing bacteria are well known in the art and the invention is not to be construed as being limited to any particular macroreticular anion exchange resin capable of removing bacteria from a liquid medium.

*AMBERSORB is a trademark of Rohm and Haas Co., Phila., Pa. 19105.

Generally, the anion exchange macroreticular resins used in practicing this invention possess an average pore size of from about 8000 Å to about 500,000 Å and preferably between about 10,000 Å and about 400,000 Å with the most preferred range being between about 25,000 Å and about 250,000 Å.

Suitable macroreticular anion exchange resins which can be used in practicing this invention are those disclosed in U.S. Pat. Nos. 3,454,493; 3,531,463; 3,663,467; and 3,816,355. Additionally, the anion exchange resin may contain chemically or physically bound microbiocides or combinations thereof as set forth in U.S. patent application Ser. No. 698,626, filed June 22, 1976 and assigned to the assignee hereof. The disclosure of the aforesaid United States patents and the patent application are hereby incorporated into this application by reference.

If desired, the column may have activated carbon present to improve the odor and taste of the liquid being passed through the column. Generally, any activated carbon suitable for liquid phase adsorption may be used and such activated carbons are well known in the art.

In order to more fully illustrate the nature of this invention and the manner of practicing the same, the following examples are presented.

EXAMPLES 1 THROUGH 6

The bacterially contaminated liquid medium which is used is prepared daily in the following manner. Two tubes containing E. coli bacteria (2 billion cells per tube) and 1300 milliliters of soil bacteria (750 grams of soil per two liters of deionized water mixed together and filtered) are added to 70 liters of deionized water which contains 25 parts per million hardness ions and 20 parts per million alkalinity ($CaCO_3$ equivalents). After mixing, the solution is passed through a sediment filter and is thereafter ready for use. Additional bacterially contaminated samples necessary to make up the volumes set forth in the Examples are prepared in the same manner.

The aforesaid liquid medium, which constitutes the influent has the following analysis:

TABLE I

| LIQUID MEDIUM SAMPLE ANALYSIS | |
| --- | --- |
| Suspended Solids | 13 ppm |
| Total Dissolved Solids | 190 ppm |
| Total Organic Carbon | 25 ppm |
| Turbidity | None |
| Free $Cl_2$ | 0.02 ppm |
| pH | 9.1 |

Examples 1 through 6 have been deliberately designed so that leakage of bacteria would take place from the ion exchange column in order to demonstrate the efficacy of the system to indicate that such leakage is occurring.

An 18" glass column, 1" in diameter, is packed with 230 milliliters of AMBERSORB®XE-352 macroreticular anion exchange resin. The inlet to the column is restricted and is connected by means of a pressure tight rubber tube to a standard laboratory pump. The outlet from the column is connected via a pressure tight rubber tube to a submicron membrane rilter having an average pore diameter of 0.45 micron. The Examples are conducted by pumping the liquid medium samples from a storage vessel through the column at a flow rate of between 220 to 240 milliliters per min. This corresponds to a bulk flow rate of 7.5 gals. per min. per cubic foot of resin. In order to measure increases in the back pressure, a pressure gauge is inserted at the inlet to the glass column via a tee fitting.

The Examples are conducted over a ten day period of time. The same column and same filter are used throughout the ten days without any treatment. At the end of each day and on weekends, the unit is allowed to stand, as is, and is again started up at the beginning of the next business day. Fresh liquid medium is prepared as afore described and is added to the liquid medium storage vessel as is needed to make up quantities of liquid medium sample required for the test. Periodically, the apparatus is shut down and samples are removed from the eflluent from the resin column and from the effluent from the filter after being passed through the resin column. The total amount of bacteria in all effluents are then measured using standard means and the amount of E. coli bacteria are also measured using standard means. The results are expressed in Table II.

TABLE II

| Column Thurput Vol. In Liters | Back Pressure (psig.) | BACTERIA CELLS PER 100 MILLILITERS | | | | | |
|---|---|---|---|---|---|---|---|
| | | Influent | | Effluent From Ion Ex. Resin | | Effluent From Submicron Filter | |
| | | E. Coli | Total Bacteria | E. Coli | Total Bacteria | E. Coli | Total Bacteria |
| 115 | 0 | 33,000,000 | 36,50,000 | 17,500 | 20,400 | 0 | 0 |
| 200 | 0 | 25,000,000 | 42,000,000 | 125,000 | 150,000 | 0 | 0 |
| 290 | 0 | 23,000,000 | 36,000,000 | 630,000 | 880,000 | 0 | 0 |
| 370 | 2 | 21,000,000 | 16,600,000 | 2,350,000 | 3,590,000 | 0 | 0 |
| 480 | 3 | 16,000,000 | 47,500,000 | 3,100,000 | 3,540,000 | 0 | 2,750 |
| 580 | 11 | 22,000,000 | 39,000,000 | 16,100,000 | 45,600,000 | 0 | 11,600 |

The foregoing Table demonstrates that, not only is the apparatus and process according to this invention effective in removing bacteria, but when the ion exchange resin is substantially exhausted, leakage of bacteria from the resin is detected by the increase in back pressure which is a result of the bacteria having been collected on the submicron filter and the submicron filter being substantially clogged with bacteria so that the back pressure will increase and demonstrate to the user that the unit must be replaced.

In one embodiment a canister 7" high and 3" in diameter is packed with a cartridge containing 0.03 cubic feet of AMBERSORB ®XE-352 macroreticular anion exchange resin. A submicron filter having an average pore diameter of 0.45 micron is placed at the bottom of the resin bed in a pressure tight manner to prevent leakage around the filter when the pressure increases. The canister is then plumbed into a cold water line and is used to provide bacteria free cooking and drinking water. The unit has a maximum service flow rate of 0.6 gals. per min. and an expected life time of 500 gals. At the point of substantial exhaustion, the back pressure becomes so great that the flow of water through the unit is reduced to a trickle. The cartridge will have a life expectancy of approximately 100 days based on a usage of 5 gals. per day for an average household (cooking and drinking water only).

The apparatus and process of this invention is not only useful when placed in a water line, but is also useful to provide a portable means for obtaining substantially bacteria-free water. For example, when sterilizing soft contact lenses, it is desirable that the water used be a bacteria-free water. Soft contact lenses are commonly prepared for the following day's usage by the wearer heating the lenses in water to a temperature of between about 150° and 160° F. Heating at this temperature will kill most, but not all, of the bacteria present. It is apparent that the use of water containing bacteria, when preparing soft contact lenses for subsequent use, will result in additional bacterial contamination and that not all of the additional bacteria will be killed when preparing soft contact lenses for subsequent use. The nature of the material from which soft contact lenses are made does not permit the heating to occur at those temperatures which would normally completely sterilize such lenses. Therefore, because a source of water is necessary when preparing such lenses for subsequent use, and the wearer usually does not have a sterile source of water available to him at the time such lenses are being prepared, the wearer will often resort to using tap water. Even if the wearer would obtain a bottle of sterile water, when the seal of the bottle is initially broken, the water would no longer be sterile. Thus, additional bacterial contamination often occurs because the wearer of such lenses has employed tap water as the source of the water for preparing the lenses for subsequent use. By attaching the apparatus of this invention to the outlet of a squeeze type plastic bottle, the wearer of soft contact lenses may employ a source of tap water and avoid additional bacterial contamination of the lenses normally associated with the use of tap water and the limited effectiveness of the process by which the lenses are prepared for subsequent use.

While this invention has been described in terms of certain preferred embodiments and illustrated by means of specific examples the invention is not to be construed as limited except as set forth in the following claims.

I claim:

1. An ion exchange column for removal of bacteria from a liquid medium comprising a column having an inlet and an outlet, a macroreticular anion exchange resin disposed within said column on the inlet side and having a pore diameter of from about 8000 Å to about 500,000 Å and capable of removing bacteria from an influent and, as an indicator for exhaustion of the capacity of said resin for removal of said bacteria, an ion exchange resin free filter having a submicron pore size of between about 0.03 to about 1 micron, said filter being operably connected to said column in a pressure tight manner on the outlet side of said column, whereby when the capacity of said resin for removal of bacteria is exhausted, said bacteria will be present in the effluent from said resin and will be collected by said submicron filter until the leakage of bacteria from said resin increases so that the pressure within said column is increased thereby reducing the flow of liquid exiting from said filter and thereby indicating the exhaustion of the capacity of said resin to remove bacteria.

2. An ion exchange column according to claim 1 wherein said filter has a pore size of from about 0.22 to about 0.45 micron.

3. An ion exchange column according to claim 1 wherein a bactericide is chemically or physically bound to said ion exchange resin.

4. An ion exchange column according to claim 3 wherein said bactericide is silver chloride.

5. An ion exchange column according to claim 1 wherein activated carbon is presnt in said column.

6. An ion exchange column according to claim 1 wherein said liquid medium is water.

7. A process for the removal of bacteria from a liquid medium comprising (1) passing a bacteria-containing liquid medium first through a bed of a macroreticular anion ion exchange resin having a pore diameter of from about 8000 Å to about 500,000 Å and capable of removing bacteria from said liquid medium and subsequently through an ion exchange resin free filter having a submicron pore size of from about 0.03 to about 1 micron while maintaining a pressure tight relationship between said filter and said resin (2) continuing the flow of liquid medium until the capacity of said resin is exhausted whereupon the submicron filter becomes clogged with bacteria passing through the resin bed causing the flow of liquid exiting from said filter to be substantially reduced.

8. A process according to claim 7 wherein said liquid medium is water.

9. A process according to claim 7 wherein said filter has a pore size of from about 0.22 to about 0.45.

10. A process according to claim 7 wherein a bactericide is chemically or physically bound to said ion exchange resin.

11. A process according to claim 10 wherein said bactericide is silver chloride.

12. A process according to claim 7 wherein said liquid medium is passed through activated carbon prior to being passed through said filter.

13. A process according to claim 7 wherein said ion exchange resin has a pore diameter of from about 10,000 Å to about 400,000 Å.

* * * * *

UNITED STATES PATENT AND TRADEMARK OFFICE
CERTIFICATE OF CORRECTION

PATENT NO. : 4,199,449
DATED : April 22, 1980
INVENTOR(S) : Frank L. Slejko

It is certified that error appears in the above—identified patent and that said Letters Patent is hereby corrected as shown below:

Column 6, line 41, "rilter" should read -- filter --.

Columns 7 and 8, TABLE II, first column, "Column Thurput" should read -- Column Thruput --.

Same TABLE II, under the heading, "Influent Total Bacteria" "36,50,000" should read -- 36,500,000 --.

Signed and Sealed this

Fourteenth Day of April 1981

[SEAL]

Attest:

RENE D. TEGTMEYER

Attesting Officer

Acting Commissioner of Patents and Trademarks